United States Patent [19]

Newell

[11] 3,732,381

[45] May 8, 1973

[54] SYSTEM FOR CORRECTING FOR DOPPLER SHIFT FREQUENCY ERROR OF TRANSMITTED SIGNALS

[75] Inventor: George F. Newell, Pittsburgh, Pa.

[73] Assignee: Westinghouse Electric Corporation, Pittsburgh, Pa.

[22] Filed: Sept. 24, 1970

[21] Appl. No.: 75,197

[52] U.S. Cl. ....................................179/100.2 K, 179/100.2 T; 340/174.1 B, 340/174.1 P

[51] Int. Cl. ..........................G11b 5/52, G11b 21/00

[58] Field of Search................179/100.2 T, 100.2 K; 340/174.1 B, 174.1 P

[56] References Cited

UNITED STATES PATENTS

| | | | |
|---|---|---|---|
| 3,419,675 | 12/1968 | Kihara | 179/100.2 T |
| 3,148,362 | 9/1964 | Pearson | 179/100.2 T |
| 3,371,158 | 2/1968 | Tanaka et al. | 179/100.2 K |
| 3,573,361 | 4/1971 | Narita | 179/100.2 T |

*Primary Examiner*—Bernard Konick
*Attorney*—F. H. Henson, E. P. Klipfel and D. Schron

[57] ABSTRACT

A system for correcting the error in frequency of color television signals received from space vehicles resultant from a Doppler shift in frequency from the desired frequency of the signals as initially transmitted. A rotating magnetic recording disk includes two magnetic recording heads positioned at the same radius and angularly speareated relative to the axis of rotation of the disk for communicating with a common recording band of the disk. The received signal is recorded by one head and read by the other, one head being fixed in position and the other being angularly movable about the disk to provide a time delay of controllable duration of the signal, between recording and reading thereof. Means are provided for adjusting the rate of change of the angular separation of the heads as a function of the Doppler shift frequency error, thereby to produce an output signal from the read head of the desired initial frequency. An embodiment with a plurality of heads in cascade is included.

2 Claims, 4 Drawing Figures

SYSTEM FOR CORRECTING FOR DOPPLER SHIFT FREQUENCY ERROR OF TRANSMITTED SIGNALS

BACKGROUND OF THE INVENTION

1. Field of the Invention

This invention relates to a system for processing signals such as color television signals and more particularly to such a system for correcting the error in frequency of transmitted signals resultant from Doppler shift in frequency from a desired initial frequency, such as is encountered in color television signals received from space vehicles.

2. Description of the Prior Art

The change or shift in frequency of signals resultant from the Doppler effect is well known to those skilled in the art, and is commonly encountered with respect to sound waves transmitted through air. The same effect occurs with respect to electromagnetic waves or signals and particularly has been encountered in the context of signal transmission during space exploration.

The Doppler shift particularly has presented a problem in the retransmission over television networks of color television signals received from space vehicles. In accordance with FCC regulations concerning the EIA/NTSC transmission standards, the color television signals transmitted over the networks must be of precise frequency and stable to within three parts per million (i.e., three parts per $10^6$). This accuracy is both desirable and necessary to assure that color receivers in home use will operate properly on the signal retransmitted over the network and received in the home.

The Doppler effect arises in relation to the transmission of signals from space vehicles due to the velocity of the space vehicle with respect to the receiving station on earth. It will, of course, be appreciated that the Doppler effect is produced in transmission between any relatively moving transmitting and receiving stations and, if the relative velocity is sufficiently great, will produce an error of a magnitude requiring correction. In the particular instance of a space vehicle leaving the earth's gravitational pull, the frequency error resultant from the Doppler shift in frequency can be as high as four parts per $10^5$.

To render such space-transmitted signals in conformance with the noted stable and precise frequency standards, attempts have been made heretofore to correct for the Doppler effect thus introduced. The prior efforts generally have employed video tape recorders connected in cascade with a variable tape loop therebetween. Adjustment of the length of the tape loop provided compensation for the frequency shift due to the Doppler effect. Such a system, however, introduces an unacceptable time delay in the processing of the signal of several seconds and requires use of an inordinate amount of expensive equipment to provide the frequency correction.

These and other disadvantages presented by the prior art systems for correction of Doppler shift in transmitted signals, and particularly those transmitted through space, are overcome by the system of the present invention. The invention accomplishes the required correction with a minimum amount of equipment and thus in a relatively inexpensive manner while introducing a negligible time delay between the received input signal to the system and the frequency corrected output signal produced by the system.

SUMMARY OF THE INVENTION

The system of the invention for correcting frequency error resultant from Doppler shift in frequency of transmitted signals, such as those received from space vehicles, includes a rotatable magnetic recording disk having two magnetic heads positioned at the same radius, or radial distance, from the axis of rotation of the disk for communicating with a common recording band of the disk. The received signal is recorded by one head and the recorded signal is read by the other to provide an output signal from the system. One head is fixed in position and the other is movable angularly about the disk to provide a time delay of controllable duration of the signal between the input and output of the system and specifically between the recording and reading of the signal.

The recording disk employed may be one heretofore employed for other purposes in processing of television signals transmitted from space. Accordingly, there is typically provided on the disk, or there may be specifically provided for the purpose of the system of the invention, a prerecorded clock track. A further magnetic reading head detects the train of clock pulses recorded on the prerecorded clock track and supplies the clock pulse train to a servo control system for comparison with a reference frequency signal, or reference clock pulse train, to generate a servo drive control for the motor which drives the magnetic disk in rotation. The disk is thus driven at a precise-uniform rotational velocity.

Means are provided for angularly moving, or rotating, the moving head relatively to the fixed head and particularly for adjusting the rate of change of the angular separation of the heads as function of the frequency shift caused by the Doppler effect thereby to correct for the Doppler shift in frequency of the received signal and to provide an output signal of the desired frequency corresponding to the original frequency of transmission of the television signal. For this purpose, periodic timing pulses, such as the horizontal line synchronizing pulses, are derived or separated from the signal read from the disk and compared with a reference clock or pulse train by a servo control system which drives the movable head in rotation. The latter servo control system thereby controls the rate of change of the angular displacement of the moving head relative to the fixed head to correct for the Doppler shift frequency error and produce at the reading head an output signal of the desired frequency.

The total time delay between the recording of the input signal and the reading of the recorded signal to produce the output signal is from a few or several milliseconds up to about one-eighth of a second. The system therefore introduces only a negligible delay time while providing a precise and efficient correction of the Doppler shift frequency error.

To increase the time period over which the Doppler effect correction can be obtained with the system of the invention, a plurality of heads may be mounted on the moving arm at radially displaced positions and a corresponding plurality of heads may be mounted at corresponding radially displaced positions along the fixed angular position such that corresponding ones of the movable and fixed heads communicate with corresponding, common recording bands on the disk. The recording and reading heads are connected electrically in a cascade arrangement. Where multiple tracks are thus employed, the rotational velocity of the moving arm carrying the movable recording heads is decreased in inverse proportion to the number of tracks with respect to the rotational velocity of the moving arm in an embodiment of the invention employing but a single pair of heads and a single common recording band. Thus, the total period over which a continuous correction of the Doppler effect frequency error may be obtained is increased in direct proportion to the number of pairs of recording/read heads and, correspondingly, the number of recording bands of the disk employed.

The invention thus provides for a relatively simple and low cost, yet versatile and effective means for correcting for the frequency error arising due to the Doppler shift in frequency of transmitted signals, such as color television signals transmitted from a space ship moving at a relative velocity with respect to a receiving station on earth.

DETAILED DESCRIPTION OF THE INVENTION

The system of the invention is of relatively low cost yet provides highly effective and accurate correction of frequency errors in a received signal for producing an output signal of the desired original frequency at which the signal was transmitted. The system has particular applicability to correcting the frequency error in transmission of color television signals from space due to Doppler effect. The Doppler effect arises due to the high velocity of the space craft relative to the earth. The same effect, of course, would be experienced between two space craft moving relatively to one another at a high relative velocity and, of course, between any sending and receiving station moving at a sufficiently high velocity relative to one another. The problems created by the frequency error due to Doppler effect are particularly pronounced in the case of transmission of color television signals and, for convenience, the invention is described in that context. However, it will be appreciated that the system of the invention has broad applicability to the correction of frequency errors in any signals capable of being processed as electrical signals in accordance with the system of the invention.

Figure 1:
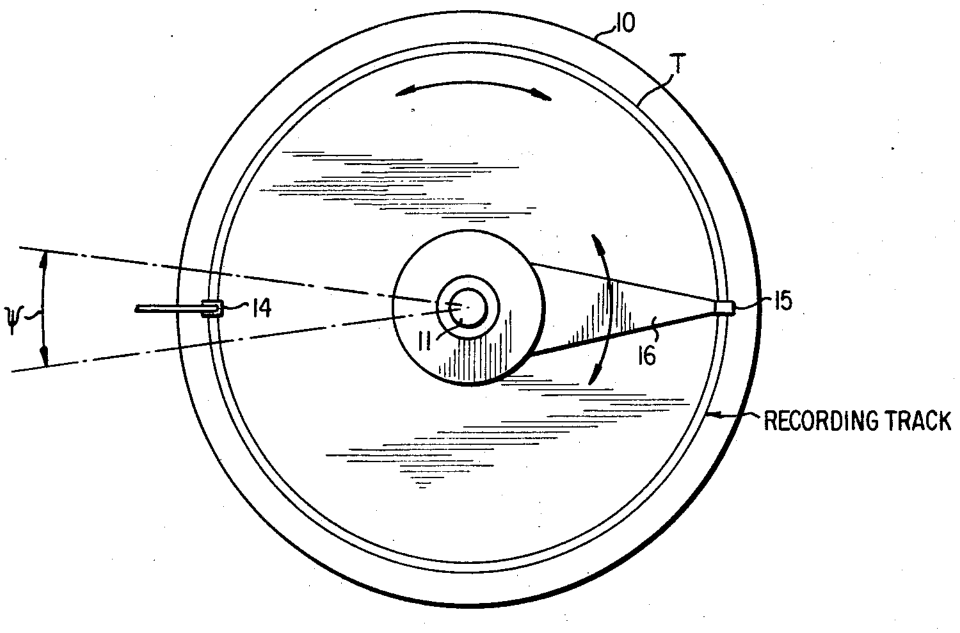
FIG. 1 is a diagrammatic, planar view of magnetic recording apparatus including a magnetic recording disk having a pair of magnetic recording heads mounted for operation in accordance with the system of the invention.
Figure 2:
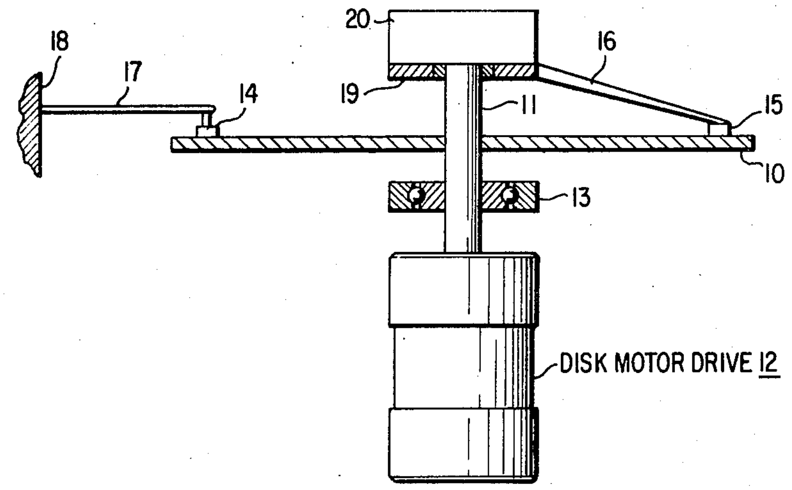
FIG. 2 is a side elevation, partially in cross-section, of the magnetic recording apparatus of FIG. 1.

In FIGS. 1 and 2 there is diagrammatically shown, respectively, a planar view and a side elevation partially in cross-section, of a magnetic recording disk 10 mounted to a central shaft 11 for being driven in rotation by a disk drive motor 12 about a fixed axis of rotation. Suitable support and bearing means 13 are provided for support of the disk 10 and the drive motor 12. A pair of magnetic recording heads 14 and 15 are mounted at common radial positions relative to the axis of rotation of the disk for communicating with a common annular ring of magnetic material, or a magnetic recording band, illustratively indicated at T.

It is to be understood that the disk 10 is of a conventional type and may provide for magnetic recording on both of its opposite planar surfaces. In the processing of television signals from space, there are various requirements of signal storage and read out capability. Thus, the recording tracks required by the system of the invention may be selected from available storage capacity on a disk used for other recording purposes.

The head 14 is connected by arm 17 to a fixed support 18 for being maintained at a fixed angular and radial position with respect to the axis of the disk 10. The head 15 is mounted by arm 16 to a bearing 19 at an equal radial position with respect to the axis of the shaft 11 but for angular movement about the axis of shaft 11. Bearing 19 conveniently may be mounted on the shaft 11 while permitting complete freedom of rotation of arm 16 and head 15 with respect thereto. A prime mover 20 controls the angular position and rate of rotation of arm 16, and thus head 15, in a manner to be described. The head 15 is rotatable through substantially 360° with the exception of a small angle identified in FIG. 1 as the angle of prohibition resultant from the physical presence of the fixed head 14 at the same radial position as the head 15.

By utilizing one of the heads, such as head 15, to record an incoming signal onto the band T of disk 10 and by using the other head, such as head 14, to read or replay the recorded signal from the track T, a time delay of controllable duration is provided. More specifically, the time delay of the signal being processed is determined by the time period between recording and reading of the signal and thus is a function of the angular separation of the heads 14 and 15 and the rotational velocity of the disk 10.

Since, as noted, the magnetic disk 10 typically is used for other purposes involved in the processing of a color television signal, it is preferable to energize the drive motor to drive the disk 10 at a uniform rotational velocity synchronized to the desired frequency standard of the output signal. Control of the time delay thus is effected by rotating the moving arm 16 and thus the head 15 relative to the fixed position of the reading head 14. Specifically, in correcting for the frequency error due to the Doppler effect, the rate of change of the angular separation of the heads 14 and 15 and thus of the time delay of the signal provides for correction of the frequency error introduced as a result of the Doppler shift. The arm 16 may be initially directed to position the head 15 diametrically opposite the head 14 and thus provide for a maximum degree of Doppler shift correction of either a positive or negative sense with respect to the initial frequency of transmission. If, however, the Doppler shift is anticipated to be primarily in one direction, the arm may be correspondingly positioned to an extreme position to increase the time period over which the Doppler correction can be continuously made.

Figure 3:
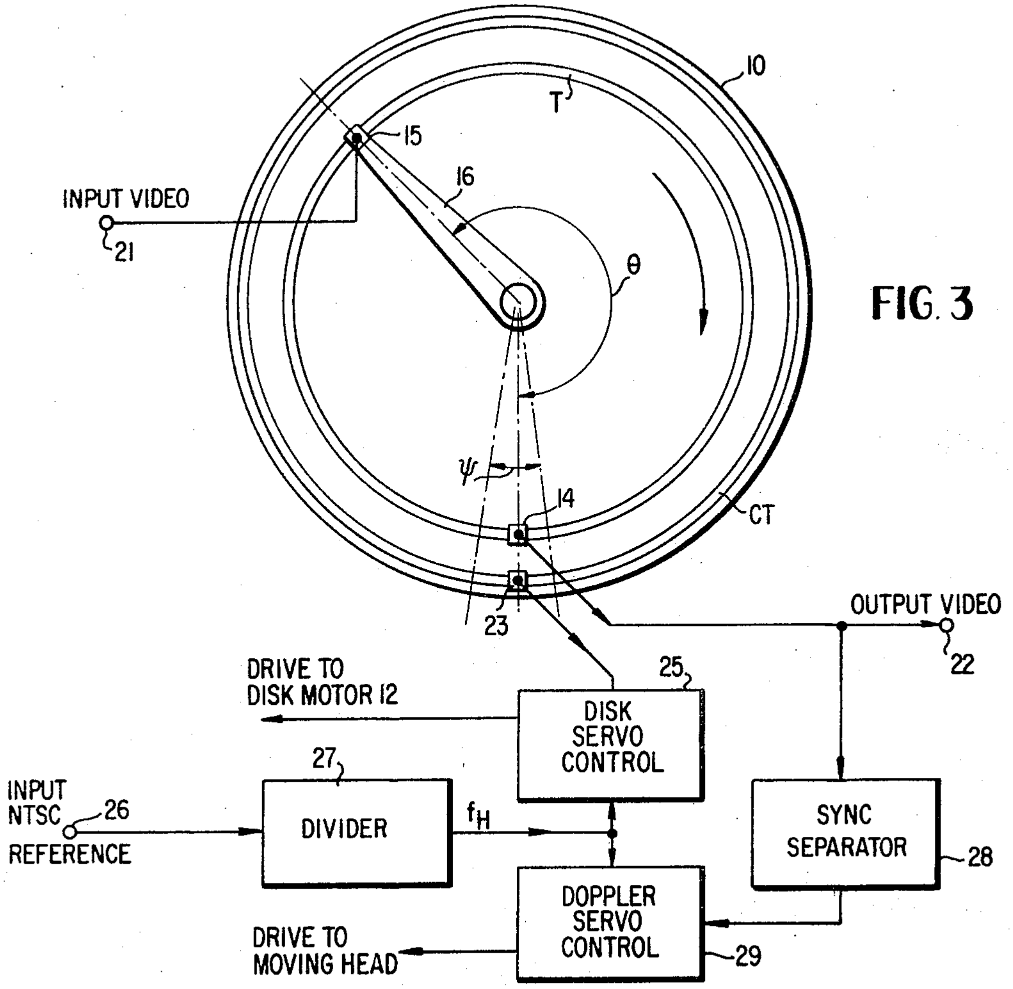
FIG. 3 shows, in diagrammatic form, magnetic recording apparatus and, in block diagram form, a control system for operation of the apparatus to correct a Doppler effect frequency error in a received signal in accordance with the invention.

In FIG. 3 is shown in block diagram form a schematic of an electrical control system for operation of a magnetic recording disk and associated heads of generally the identical construction as that of FIG. 1 and wherein common numerals are employed to identify the corresponding elements of the device shown in FIG. 1. Thus, there is again shown the disk 10 and the movable head 15 mounted on arm 16 at the same radial distance as the fixed head 14 relative to the axis of rotation of disk 10 for communicating with a common recording band or track T.

The input video signal is applied to terminal 21 connected to the movable head 15 for recording thereby on the track T. The recorded video signal is read from track T by head 14 a period of time thereafter, in accordance with the angle $\theta$ separating the heads 14 and 15 and with respect to the velocity of rotation of the disk 10. The output signal derived from the head 14 is provided at the output terminal 22, the output signal having been corrected for the frequency error due to the Doppler shift and particularly being provided at the desired initial frequency of transmission of the signal. The output video signal thus derived is of the proper frequency for retransmission through network television.

In FIG. 3, there is further provided a magnetic head 23 positioned at a fixed radial and angular position with respect to the axis of the disk 10 and communicating with an annular band of magnetic material defining a recording track CT. The track CT has prerecorded thereon a clock pulse train which can comprise, conveniently, 525 pulses spaced equally around the circumference of the track CT. The selection of 525 pulses is in accordance with the frame frequency defined by the NTSC standards.

The clock pulse train derived by reading the recorded pulses of track CT by the head 23 is applied to a servo control system 25. A reference clock pulse train derived from an input NTSC reference signal supplied to terminal 26 through divider 27 is also applied to the servo control system 25. The servo control system 25 compares the clock pulse train from the reference NTSC signal and the train derived by reading the pulses recorded on track CT, and produces as an output a drive control signal for the disk drive motor 12, shown in FIG. 2, for rotating of the disk 10. The control thus afforded assures uniform and precise rotation of the disk 10, the 525 prerecorded pulses of track CT thus being read at a repetition rate conforming with the frame rate defined by the NTSC standard reference signal. Thus, the disk rotational velocity is maintained at the correct frame frequency required for network television. In practice, this servo drive system is normally present for other signal processing operations which are performed on, or utilize the recording capacity of, the same disk 10.

To provide for correction of the frequency error due to Doppler shift, the output signal from head 14 is also supplied to a sync separator circuit 28 which, in conventional fashion, provides a train of sync pulses at the horizontal line rate to a second servo control system identified as the Doppler servo control 29 in FIG. 3. The Doppler servo control 29 compares the train of horizontal line synchronizing signals provided by sync separator 28 with the horizontal line frequency signal $f_h$ derived, or divided, from the NTSC reference signal by divider 27. The control system 29 determines whether the frequency error represents an increase or decrease in the frequency of the received signal relative to the standard and produces a corresponding drive control to the prime mover 20 for the movable arm 16. As above described, the position and rotational velocity of the movable arm 16 is thereby controlled to provide the appropriate time delay and rate of change of that delay for connecting to the Doppler effect frequency error. The prime mover 20 for arm 16 and the moving head 15 may comprise an electrical motor or any suitable, conventional mechanical coupling such as a pulley system, gears, or a worm drive in turn connected to suitable motor means.

To provide a more precise analysis of the control functions and frequency correction provided by the system of the invention, let the frequency of the received signal be represented by $w + \Delta w$ where $w$ is the frequency in the absence of Doppler shift, i.e., the desired output frequency, and $\Delta w$ represents the Doppler frequency shift. Further, where $\phi$ equals the phase delay between the moving and fixed heads at the frequency $w$ of the signal, the operation of the system can be expressed as:

$$w + \Delta w - d\phi/dt = w \qquad (1)$$

Further, where $\theta$ equals the physical angle subtended at the disk center, or axis, by the radial lines passing through the fixed head 14 and the moving head 15, and R equals the rotational velocity of the disk, $$\phi = \theta w/R \qquad (2)$$

Then, from equation (1), $$\Delta w = d\phi/dt, \text{ and} \qquad (3)$$

$$\int \Delta w \, dt = \phi \qquad (4)$$

$$\Delta w\, t = \phi \qquad (5)$$

$$\Delta t = \theta/R \qquad (6)$$

$$\theta = \Delta R t, \text{ and} \qquad (7)$$

$$d\theta/dt = \Delta R \qquad (8)$$

Thus, the rate of change of $\theta$ must be made proportional to the Doppler shift frequency to correct for the resultant frequency shift, or error.

For a space vehicle traveling at an escape velocity of 25,000 miles per hour, the frequency shift $\Delta w$ has a maximum value of approximately $4 \times 10^{-5}$. If the maximum excursion of the moving arm is 5.75 radians, the time required for the moving head to traverse its full coverage is given by:

$$t = \theta \text{ max.}/R$$

For $R = 188$ radians/sec. (30 rotations per second)

$t = 12.4$ minutes $d\theta/dt = 0.4$ radian/minute

Thus, for transmissions from space vehicles traveling at maximum velocity, the moving arm can travel in one direction for about 12 minutes.

For a space craft in lunar orbit, where the velocity would be much less than 25,000 miles per hour, the apparatus of FIG. 3 could be operated continuously in one direction for a period of about 1 hour to correct for the Doppler shift frequency error introduced in television signals transmitted to the earth.

Figure 4:
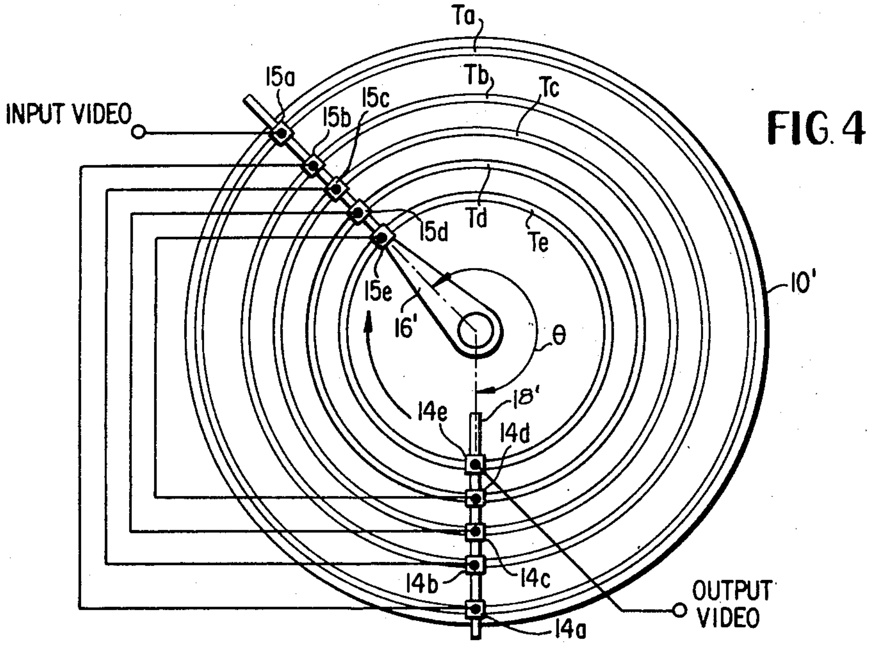
FIG. 4 is a planar view of a magnetic recording disk having a plurality of pairs of corresponding recording and reading magnetic heads electrically connected in a cascade configuration for use in accordance with the system of the invention.

To obtain a greater period of continuous operation of the system of the invention, a plural recording track system as shown in FIG. 4 may be employed. The disk 10' of FIG. 4 may be identical to the disk 10 of FIG. 1 and similarly include a pair of fixed and movable heads **14*a* and 15*a* as indicated. In addition, there are provided on a common fixed mounting support 18' magnetic recording heads 14*b* through 14*e* and on the movable arm 16' additional movable heads 15*b* through 15*e*. The plurality of heads 14*a* through 14*e* and the corresponding plurality of heads 15*a* through 15*e* are mounted at respectively corresponding, radially displaced positions along their common radial directions. The respectively corresponding heads of the pairs 14*a* through 14*e* and 15*a* through 15*e*** thus communicate with corresponding magnetic recording tracks T*a* through T*e*.

The plurality of movable heads are connected in cascade with the plurality of fixed heads, the input video signal being provided to head **15*a* and the output video signal being derived from head 14*e***. By this connection arrangement, the variable time delay tracks afforded by the recording bands T*a* through T*e* are connected in cascade to provide an increased time delay capacity for the disk 10', as compared with the single recording and read head structure of FIG. 1. The rotational velocity of the movable arm 16' in FIG. 4 is decreased in inverse proportion to the number of tracks, and thus is one-fifth that of the arm 16 in FIG. 1 carrying only the single head 15. Thus, where the device as shown in FIGS. 1 and 3 provides continuous correction for maximum Doppler shift over a period of about 12 minutes, the device of FIG. 4 provides continuous correction for about 1 hour.

Although not shown, suitable electronic signal processing circuits such as amplifiers, modulators and demodulators and various power supply and driver circuits would be provided in an operating system in accordance with the invention. For example, there would be provided amplifiers and power supply systems for energizing the recording head to record the video signal and for receiving and amplifying the signals read by the read, or replay, head, as is conventional and well known to those skilled in the art. As a further example, in the multiple track system of FIG. 4, amplification stages are provided in the cascade connection of plural recording and replay heads, particularly to compensate for signal attenuation occurring in the successive steps of recording and replay of the video signal. The provision of such suitable electronics is of course well known to those skilled in the art and therefore has not been included in the present disclosure of the invention. The servo drive system described with respect to FIG. 3 could also be incorporated in this embodiment by the addition of a suitable clock pulse track, magnetic head, and the associated servo control equipment described above.

In summary, the invention thus affords a relatively low cost system which is highly effective and accurate in correcting for Doppler shift frequency errors in transmitted signals, and has particular application to correction of the Doppler effect frequency error in color television signals transmitted from space craft to the earth. The system of the invention is particularly useful in the noted special application in that magnetic disks and associated control and servo mechanisms are typically employed in other steps of processing such space color television signals. Whereas the system and apparatus of the invention provide for a relatively long period of continuous correction of the Doppler shift frequency error, the total insertion delay is minimal, ranging from a fraction of a second to several milliseconds for each track used.

Numerous modifications and adaptations of the system of the invention will readily be apparent to those skilled in the art and thus it is intended by the appended claims to cover all such modifications, and adaptations which fall within the true scope and spirit of the invention.

I claim as my invention:

1. A system for correcting an error in the frequency of an input signal, comprising in combination:
   a. a magnetic recording disk rotatable about an axis of rotation;
   b. first and second magnetic transducer means respectively comprising a plurality of recording, and a plurality of reading heads, said recording and reading heads being divided into a plurality of head pairs with each of said head pairs including at least a recording and a reading head;
   c. means for mounting each of said head pairs on a radius and a fixed distance from said axis of rotation such that each of said head pairs can be used to record data on and read data from a common track on said recording disk, with the heads comprising each of said head pairs having an angular separation therebetween;
   d. means for coupling said recording and reading heads in cascade with a first recording head recording the input signal and a last reading head of the cascade connection producing the output signal, to provide a time delay whose duration is controlled by the angular positions of said reading heads with respect to said recording heads.

2. A system for correcting an error in frequency of an input frequency, comprising in combination:
   a. a magnetic recording disk rotatable about an axis of rotation;
   b. first and second magnetic transducer means for respectively recording and reading an input signal, said first magnetic transducer means comprising a first plurality of magnetic recording heads mounted at radially displaced positions along a first common radius relative to said axis of rotation for communicating with a corresponding plurality of concentric, radially displaced recording bands of said disk, said second magnetic transducer means comprising a second plurality of magnetic reading heads corresponding to said first plurality of recording heads mounted, respectively, at the same radially displaced positions along a second common radius angularly separated from said first common radius relative to said axis of rotation for communicating with the corresponding radially displaced concentric recording bands of said disk, said recording and reading heads of said first and second pluralities thereof being electrically coupled in cascade with a first recording head recording the input signal and a last reading head of the cascade connection producing the output signal, c. means for mounting said second magnetic transducer for rotation about said axis of rotation to vary the angular separation between said first and second magnetic transducer means;

d. means for rotating said recording disk at a predetermined uniform rotational velocity;

e. means for deriving from the output signal produced by said second transducer means a signal representing the frequency of said output signal;

f. means for receiving a reference signal representing the desired frequency of said output signal and for receiving said signal representing the frequency of said output signal produced by said deriving means and for comparing the reference frequency signal and said signal representing the frequency of said output signal to produce a control signal corresponding to any difference in frequency therebetween; and g. means responsive to said control signal for moving the rotatably mounted second magnetic transducer means to change said angular separation at a rate related to the difference between the frequency of said output signal and the desired frequency thereof to produce at said second magnetic transducer means an output signal of the desired frequency.

* * * * *